(12) United States Patent
Hayakawa

(10) Patent No.: US 9,240,861 B2
(45) Date of Patent: Jan. 19, 2016

(54) STP PATHWAY CONTROL SYSTEM APPLIED TO WIRELESS COMMUNICATION DEVICE HAVING AMR FUNCTION

(75) Inventor: Yoshiaki Hayakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 202 days.

(21) Appl. No.: 13/997,705

(22) PCT Filed: Dec. 27, 2011

(86) PCT No.: PCT/JP2011/080240
§ 371 (c)(1),
(2), (4) Date: Jun. 25, 2013

(87) PCT Pub. No.: WO2012/091025
PCT Pub. Date: Jul. 5, 2012

(65) Prior Publication Data
US 2013/0308437 A1  Nov. 21, 2013

(30) Foreign Application Priority Data

Dec. 27, 2010 (JP) ................................ 2010-289179

(51) Int. Cl.
*G01R 31/08* (2006.01)
*H04N 7/12* (2006.01)
(Continued)

(52) U.S. Cl.
CPC .............. *H04L 1/003* (2013.01); *H04L 1/0003* (2013.01); *H04W 24/04* (2013.01)

(58) Field of Classification Search
CPC ........... H04L 1/00; H04L 1/003; H04L 12/28; H04L 23/02; G01R 31/08; H04N 7/12
USPC ......... 370/216–221, 225–228, 242–256, 400, 370/401, 468, 395.21; 375/240.27, 219,375/360, 346, 141, 326, 349, 225; 455/501, 455/504, 513, 63.1, 452.2, 135
See application file for complete search history.

(56) References Cited

U.S. PATENT DOCUMENTS 6,754,169 B2 * 6/2004 Baum et al. ................... 370/204
6,965,639 B2 * 11/2005 Uesugi .................. H04L 1/0003
370/543

(Continued)

FOREIGN PATENT DOCUMENTS

JP       10-041876 A      2/1998
JP       2005-303827 A    10/2005

(Continued)

OTHER PUBLICATIONS

OAM (Operations, Administration, and Maintenance; IEEE802.1ag)/ITU-T Y.1731.

(Continued)

*Primary Examiner* — Hanh N Nguyen
(74) *Attorney, Agent, or Firm* — Sughrue Mion, PLLC

(57) ABSTRACT

A pathway control system, implementing control and setting for a communication pathway between wireless communication devices each implementing wired communication and wireless communication and each equipped with an AMR function, detects communication speed with respect to uplink wireless communication and downlink wireless communication in each wireless communication device, thus determining which one of uplink wireless communication and downlink wireless communication undergoes communication failure. It carries out adaptive modulation control on uplink wireless communication or downlink wireless communication, which undergoes communication failure, calculates new communication speed, and carries out STP pathway control based on new communication speed. Irrespective of a reduction of line speed due to activation of an AMR function, it is possible to automatically switch to redundant pathways by way of STP pathway control; it is possible to prevent momentary disconnection of wireless communication; and it is possible to maintain an adequate capacity for communication pathways.

10 Claims, 11 Drawing Sheets

(51) Int. Cl.
 *H04L 1/00* (2006.01)
 *H04W 24/04* (2009.01)

(56) References Cited

U.S. PATENT DOCUMENTS 8,014,439 B2 * 9/2011 Sakamoto ............ H04L 1/0003
 370/278
8,325,742 B2 * 12/2012 Mueller et al. ................ 370/401

FOREIGN PATENT DOCUMENTS

| JP | 2009-177459 A | 8/2009 |
| JP | 4459973 B2 | 4/2010 |
| JP | 2010-171542 A | 8/2010 |
| WO | 2005/079025 A1 | 8/2005 |

OTHER PUBLICATIONS

ANSI/IEEE Std 802.1D 1998 Edition.

* cited by examiner

FIG. 6

| NETWORK IDENTIFIER | LINE SPEED | COST VALUE |
|---|---|---|
| WIRED NETWORK B | 100MBPS | 19 |
| WIRED NETWORK C | 1000MBPS | 4 |
| WIRELESS NETWORK X | 310MBPS | 9 |
|  |  |  |

FIG. 7

| PORT NUMBER | WIRELESS COMMUNICATION DEVICE NUMBER | MAC ADDRESS | COST VALUE |
|---|---|---|---|
| A1 | 10a | 00:00:4C:00:00:11 | 9 |
| B1 |  |  | 19 |
| A2 | 10b | 00:00:4C:00:00:12 | 9 |
| B2 |  |  | 4 |
| A3 | 10c | 00:00:4C:00:00:13 | 19 |
| B3 |  |  | 4 |
| A4 | 10d | 00:00:4C:00:00:14 | 9 |
| B4 |  |  | 4 |
| ⋮ | ⋮ | ⋮ | ⋮ |

| NETWORK IDENTIFIER | LINE SPEED | COST VALUE |
|---|---|---|
| WIRED NETWORK B | 100MBPS | 19 |
| WIRED NETWORK C | 1000MBPS | 4 |
| WIRELESS NETWORK X | 10MBPS | 105 |
|  |  |  |

STP PATHWAY CONTROL SYSTEM APPLIED TO WIRELESS COMMUNICATION DEVICE HAVING AMR FUNCTION

CROSS REFERENCE TO RELATED APPLICATIONS

This application is a National Stage of International Application No. PCT/JP2011/080240 filed Dec. 27, 2011, claiming priority based on Japanese Patent Application No. 2010-289179, filed Dec. 27, 2010, the contents of all of which are incorporated herein by reference in their entirety.

TECHNICAL FIELD

The present invention relates to a pathway control system applied to a wired/wireless network configured of a plurality of communication devices, in particular to an STP pathway control system implementing STP pathway control on a wireless communication device having an AMR function.

The present application claims priority on Japanese Patent Application No. 2010-289179 filed Dec. 27, 2010, the entire content of which is incorporated herein by reference.

BACKGROUND ART

Wireless communication lines, connecting between a plurality of wireless communication devices, are each configured of a primary line and an overhead bit, wherein they may be degraded in wireless communication quality due to a reduction of a reception level via fading when an overhead bit includes a supervisory control line (i.e. an SV line). Patent Literature 1 discloses a wireless communication device having an adaptive modulation rate function (i.e. an AMR function: Adaptive Modulation Rate) which detects degradation of wireless communication quality so as to switch modulation to low-rate modulation, thus preventing line disconnection.

It is possible to adopt a wired network as a primary line, wherein due to the property of a wired network, congestion may occur due to the occurrence of a loop connection via a primary line. To prevent this problem, various devices (e.g. hubs, switches) configuring a network may adopt pathway control using STP (Spanning Tree Protocol) or RSTP (Rapid Spanning-Tree Protocol) so as to terminate redundant pathways, thus preventing a loop connection. There exists a technology defined by the Ethernet OAM (Operations, Administration, and Maintenance; IEEE802.1ag)/ITU-T Y.1731 such as ERP (Ethernet Ring Protection), wherein this technology needs a manual operation to perform an STP operation and is therefore limited in applied usage.

Patent Literature 2 discloses a technology for fixedly controlling communication pathways according to GMPLS (Generalized Multi-Protocol Label Switching). This technology needs to implement various device settings by manually designing networks, including auxiliary pathways, in advance.

Patent Literature 3 discloses a technology which aims to maintain predetermined data transmission speed and transmission quality even when wireless communication lines are degrading rapidly and which selects auxiliary lines so as to switch to a modulation scheme with low multiplicity, thus modulating and transmitting data signals.

CITATION LIST

Patent Literature

Patent Literature 1: Japanese Patent Application Publication No. 2009-177459

Patent Literature 2: Japanese Patent No. 4459973
Patent Literature 2: Japanese Patent Application Publication No. 2010-171542

SUMMARY OF INVENTION

Technical Problem

When an STP pathway control process terminates redundant pathways in a network based on path cost, a wireless communication device having an AMR function cannot carry out appropriate pathway control because it does not reduce path cost due to a reduction of line speed. For this reason, it is impossible for a wireless communication device to implement switching to redundant pathways irrespective of the presence of redundant pathways in a network undergoing a reduction of line speed.

The present invention is made in consideration of the aforementioned circumstances and relates to an STP pathway control system which allows a wireless communication device having an AMR function to carry out STP pathway control in consideration of path cost.

Solution to Problem

The present invention provides a pathway control system implementing control and setting of communication pathways among a plurality of wireless communication devices. Each wireless communication device detects communication speed with respect to uplink wireless communication and downlink wireless communication, determines which one of uplink wireless communication and downlink wireless communication undergoes communication failure, implements adaptive modulation control on uplink wireless communication or downlink wireless communication undergoing communication failure, calculates new communication speed, and carries out STP pathway control based on the new communication speed.

The present invention provides a pathway control method implementing control and setting of communication pathways among a plurality of wireless communication devices. Each wireless communication device detects communication speed with respect to uplink wireless communication and downlink wireless communication, determines which one of uplink wireless communication and downlink wireless communication undergoes communication failure, carries out adaptive modulation control on uplink wireless communication or downlink wireless communication undergoing communication failure, calculates new communication speed, and carries out STP pathway control based on the new communication speed.

The present invention provides a wireless communication device which is able to perform wired communication and wireless communication. The wireless communication device includes a communication speed detector which detects communication speed with respect to uplink wireless communication and downlink wireless communication, a failure occurrence determination part which determines which one of uplink wireless communication and downlink wireless communication undergoes communication failure, an adaptive modulation controller which carries out adaptive modulation control on uplink wireless communication or downlink wireless communication undergoing communication failure so as to calculate new communication speed, and a pathway controller which carries out STP pathway control based on the new communication speed.

The present invention provides a processing method for a wireless communication device which is able to carry out wired communication and wireless communication. This processing method implements the steps of: detecting communication speed with respect to uplink wireless communication and downlink wireless communication; determining which one of uplink wireless communication and downlink wireless communication undergoes communication failure; carrying out adaptive modulation control on uplink wireless communication or downlink wireless communication undergoing communication failure; calculating new communication speed; and carrying out STP pathway control based on the new communication speed.

The present invention provides a program executable with a computer of a wireless communication device which is able to carry out wired communication and wireless communication. This program implements the steps of: detecting communication speed with respect to uplink wireless communication and downlink wireless communication; determining which one of uplink wireless communication and downlink wireless communication undergoes communication failure; carrying out adaptive modulation control on uplink wireless communication or downlink wireless communication undergoing communication failure; calculating new communication speed; and carrying out STP pathway control based on the new communication speed.

Advantageous Effects of Invention

Using a network having redundant pathways, the present invention allows a wireless communication device, which undergoes a reduction of line speed due to activation of an AMR function, to automatically switch to redundant pathways via STP pathway control, thus maintaining an adequate capacity for communication pathways. Additionally, it is possible to implement appropriate pathway control on any communication pathways combining LAN and WAN as well as any wireless networks by way of STP pathway control.

BRIEF DESCRIPTION OF DRAWINGS

FIG. 6 A list illustrating the relationship between line speeds and cost values in a communication network.

FIG. 7 A list of cost values in connection with segments connected to ports of wireless communication devices configuring the pathway control system.

DESCRIPTION OF EMBODIMENT

Figure 1:
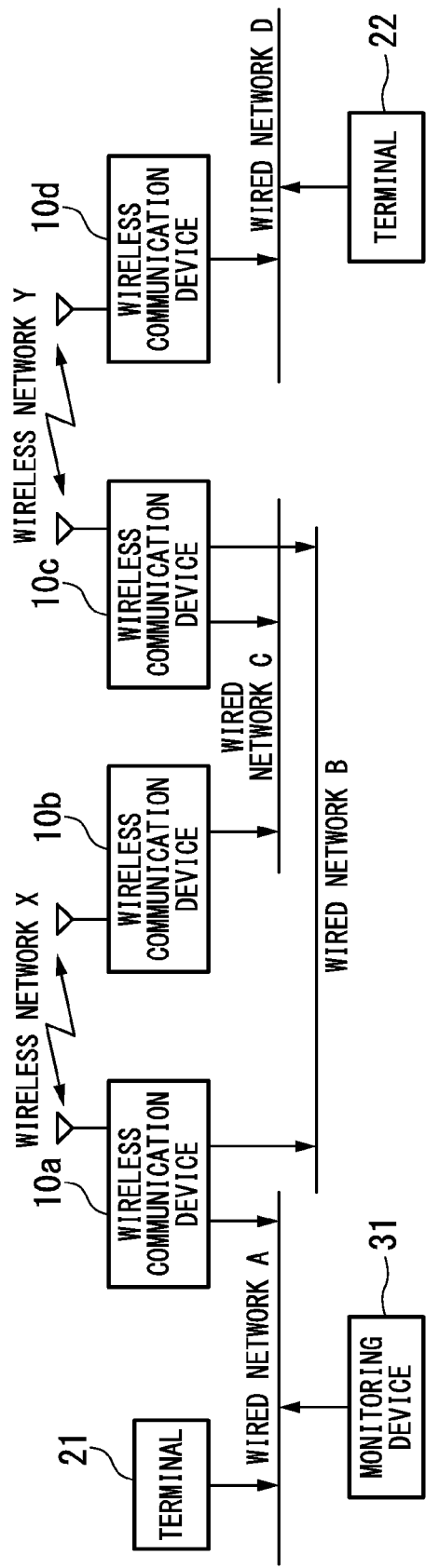
FIG. 1 A block diagram of a pathway control system according to a preferred embodiment of the present invention.

FIG. 1 is a block diagram of a pathway control system according to a preferred embodiment of the present invention. The pathway control system includes four wireless communication devices 10 (i.e. 10a, 10b, 10c, 10d). The wireless communication device 10 has a communication function implementing wired communication via a wired network and wireless communication via a wireless network. Alternatively, the wireless communication device 10 may solely implement a wireless communication function via a wireless network without implementing a wired communication function via a wired network. Additionally, the pathway control system includes two terminals 21, 22, each of which has a communication function via a wired network or a wireless network. As the terminals 21, 22, it is possible to employ computers which allow users to carry out information processing. A monitoring device 31 monitors a communication condition of a communication network and provides a function of EMS (Element Management System) or NMS (Network Management System).

The pathway control system of the present embodiment is configured of the foregoing constituent elements which are connected via a wired network or a wireless network. Specifically, the terminal 21 is connected to the wireless communication device 10a via a wired network A. The monitoring device 31 is connected to the wired network A. The monitoring device 31 monitors traffic of communication in the wired network A.

The wireless communication device 10a is connected to the wireless communication device 10b via a wireless network X and is also connected to the wireless communication device 10c via a wired network B. That is, either the wireless network X connecting between the wireless communication devices 10a, 10b or the wired network B connecting between the wireless communication devices 10a, 10c is selected as a pathway to establish a communication connection between the terminals 21, 22.

The wireless communication device 10b is connected to the wireless communication device 10c via a wired network C, while the wireless communication device 10c is connected to the wireless communication device 10d via a wireless network Y. The wireless communication device 10d is connected to the terminal 22 via a wired network D.

Figure 2:
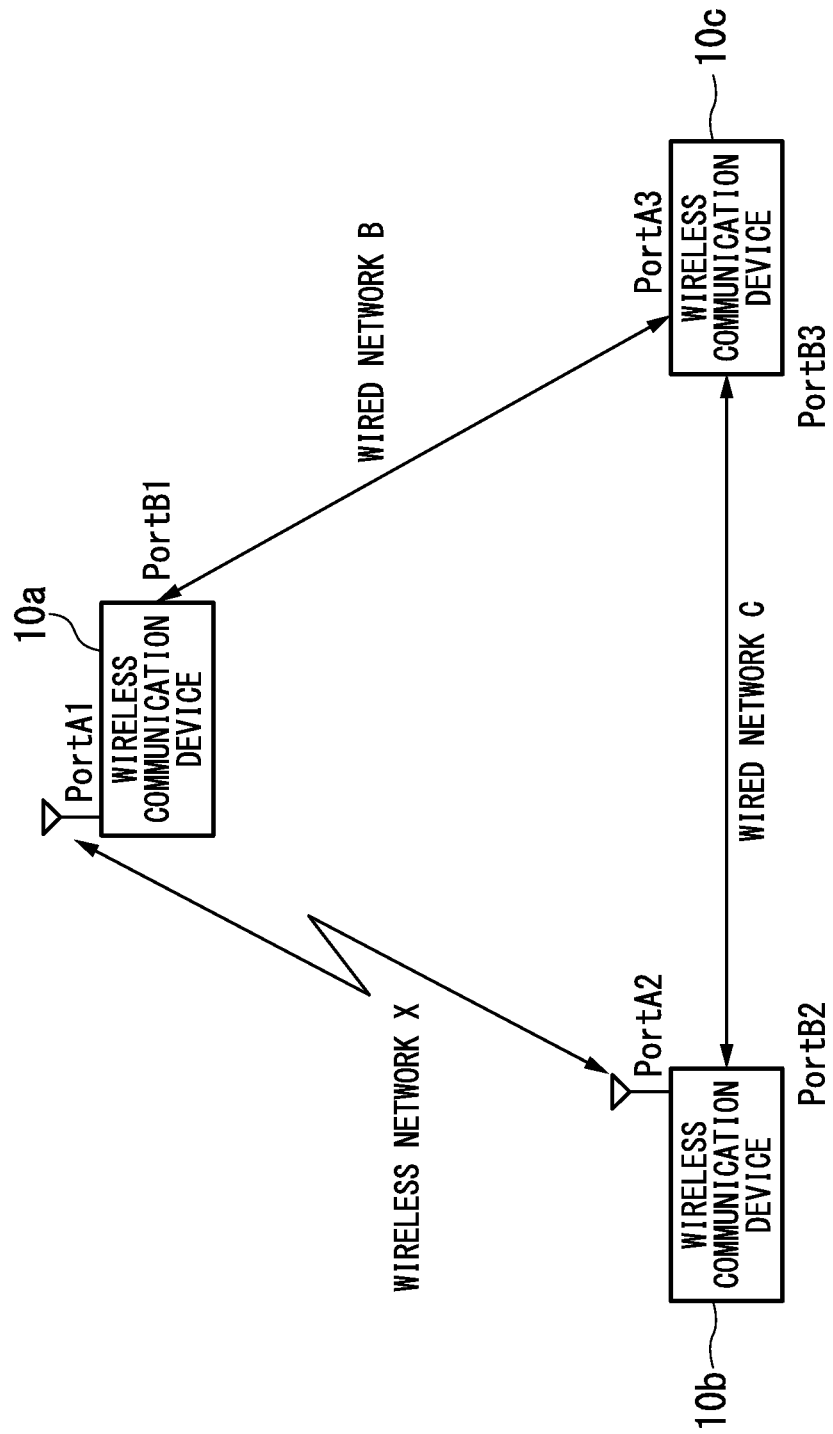
FIG. 2 A block diagram showing a network configuration of the pathway control system.

FIG. 2 is a block diagram illustrating a network configuration of the pathway control system, wherein the wireless communication devices 10a, 10b, 10c are mutually connected to form a loop pathway. A phenomenon called a broadcast stream may occur when broadcast packets circulate through the wireless communication devices 10a, 10b, 10c, thus incurring a possibility of consuming CPU resources and bandwidths of communication pathways. The pathway control system of the present embodiment implements STP (Spanning Tree Protocol) pathway control to prevent a broadcast stream phenomenon.

Figure 3:
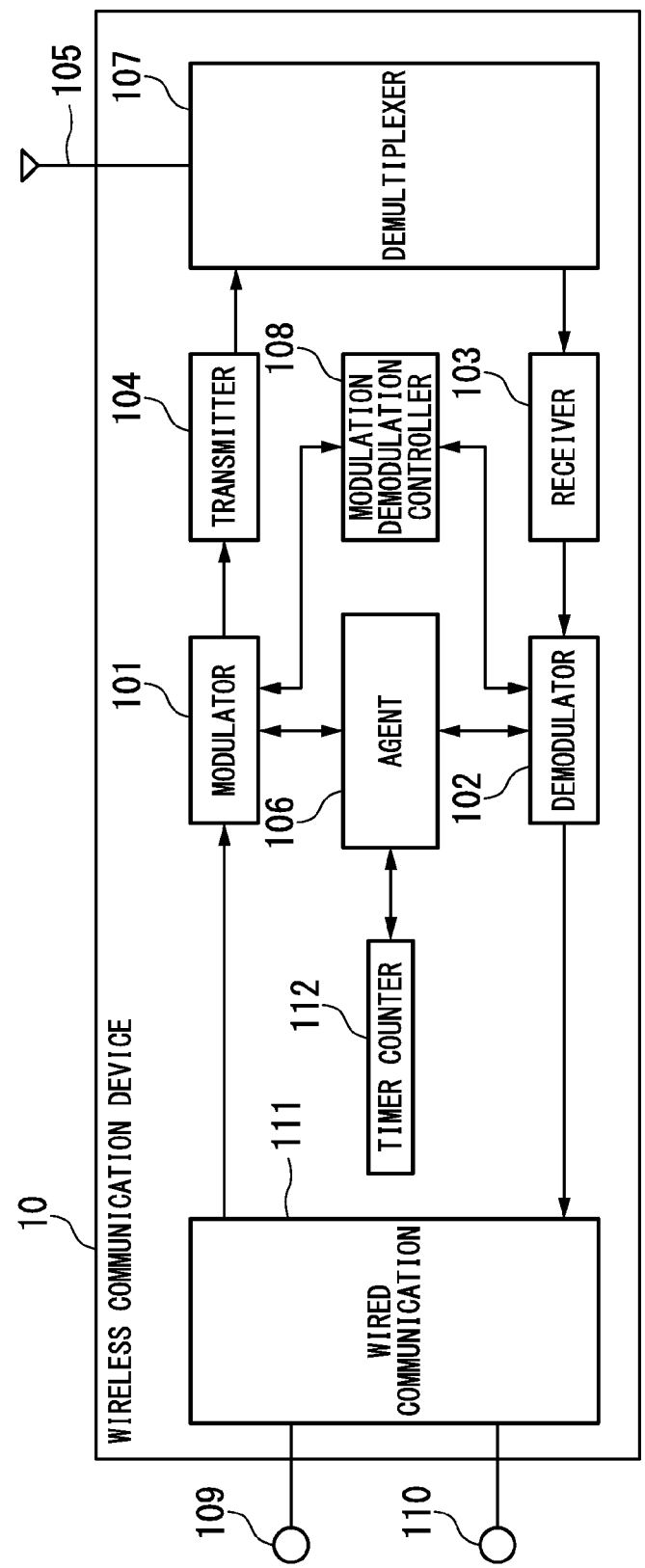
FIG. 3 A functional block diagram of a wireless communication device applied to the pathway control system.

FIG. 3 is a functional block diagram of the wireless communication device 10. The wireless communication device 10 includes a modulator 101, a transmitter 104 having an amplification function, an antenna 105, a demultiplexer 107, a receiver 103, a demodulator 102, a modulation demodulation controller 108 which changes a modulation scheme in response to conditions of transmission paths, an agent 106 which receives signals from the other wireless communication devices 10 to perform pathway control, an input terminal 109, an output terminal 110, a wired communication part 111 which performs a wired communication process via a wired network, and a timer counter 112 which performs a time check process.

Figure 4:
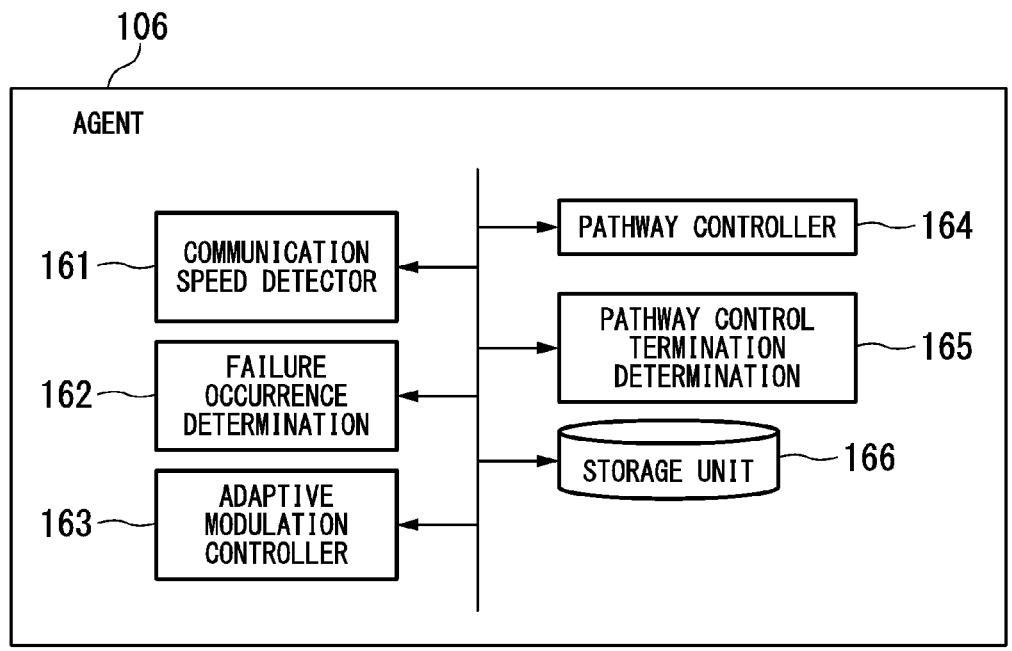
FIG. 4 A functional block diagram of an agent included in the wireless communication device.

FIG. 4 is a functional block diagram of the agent 106. The pathway control system of the present embodiment carries out control and setting for communication pathways with a plurality of communication devices performing wireless communication or wired communication. FIG. 4 shows the configuration of the agent 106 included in the wireless communication device connected to the other communication device among a plurality of communication devices performing wireless communication or wired communication. Specifically, a communication speed detector 161 detects uplink communication speed and downlink communication speed. A failure occurrence determination part 162 determines whether or not communication failure occurs in uplink wireless communication or downlink wireless communication. An adaptive modulation controller 163 instructs the modulation demodulation controller 108 to perform adaptive modulation control on wireless communication in a direction undergoing communication failure. A pathway controller 164 carries out STP pathway control based on new communication speed which is selected via adaptive modulation control. A pathway control termination determination part 165 terminates STP pathway control when a recovery degree of communication speed, which is newly selected via adaptive modulation control, per unit time is equal to or above a threshold value. A storage unit 166 stores various pieces of information produced by the foregoing processors 161 to 165. In this connection, the "recovery degree of communication speed per unit time" indicates a variation of communication line speed, i.e. speedup of communication speed due to recovery of wireless line quality.

Figure 5:
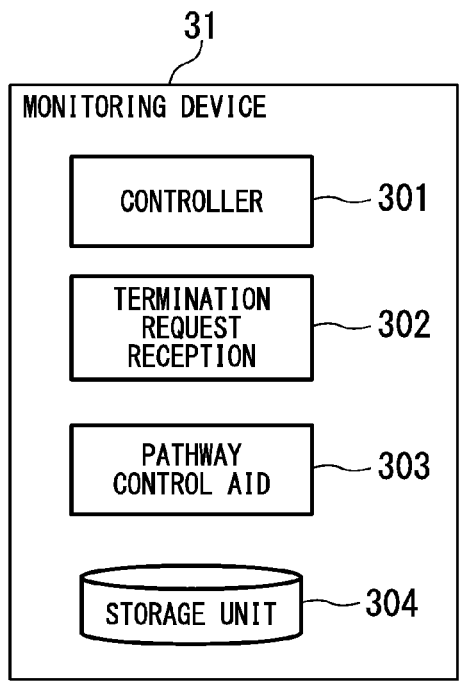
FIG. 5 A functional block diagram of a monitoring device included in the pathway control system.

FIG. 5 is a functional block diagram of the monitoring device 31. The monitoring device 31 includes a controller 301, a termination request reception part 302 which receives a termination request of a communication pathway connecting any two communication devices according to a pathway control system, a pathway control aid part 303 which calculates STP cost values used for a communication pathway connecting two communication devices with respect to the termination request so as to transmit STP cost values to two communication devices, and a storage unit 304 which stores various pieces of information.

Next, detailed processes of the pathway control system will be described. First, a normal-mode process, in which fading does not occur in a wireless network according to the pathway control system, will be described.

Additionally, cost values, applied to the ports of the communication device 10, used for STP calculation are based on the standard of "ANSI/IEEE Std 802.1D 1998 Edition", for example, wherein cost values, applied to a pair of discontinuous communication speeds, may adopt "4 MBPS (Mega Bit Per Second)=250, 100 MBSP=19". However, this standard cannot realize the operation of the present embodiment because it does not clearly stipulate cost values with respect to a wireless network whose line speed is continuing in MBPS units due to an adaptive modulation function (i.e. an AMR function).

To solve the above problem, a cost value applied to a port of the wireless communication device 10 conducting wireless communication should be calculated using the following approximation.

Cost value=561.3×(line speed: MBPS unit)^−0.73

Herein, a symbol "^" represents power calculation. It is necessary to round off the calculated values to the first decimal place in the above calculation because cost values are integers within a range of "1" to "65535".

The present embodiment uses different frequencies between uplink communication (hereinafter, referred to as "UPLINK") and downlink communication (hereinafter, referred to as "DOWNLINK"), which are conducted between the wireless communication device 10 having an AMR function and its counterpart device. Normally, the same line speed is used in UPLINK and DOWNLINK. However, it is presumed that an AMR function may be activated solely in a communication line in one direction between UPLINK and DOWNLINK when a reflected wave causes fading affecting a specific frequency. In this case, a communication capacity may be reduced with respect to a communication line solely in one direction between UPLINK and DOWNLINK. As a result, a capacity of UPLINK may disagree with a capacity of DOWNLINK. Conventional wireless communication devices are not designed to update pathway control even when an inconsistency regarding a capacity occurs between UPLINK and DOWNLINK; this may incur a degradation factor for line quality. The present embodiment provides a technology for solving this problem.

Due to the occurrence of an inconsistency regarding line speed between UPLINK and DOWNLINK (or an inconsistency regarding transmission speed due to a reduction of a bandwidth in one direction between UPLINK and DOWNLINK), the present embodiment sets cost values, applied to the ports of the communication device 10, by use of cost values applied to a communication line having a lower line speed between UPLINK and DOWNLINK. Thus, it is possible to appropriately select pathways, owing to the presence of auxiliary pathways, irrespective of the occurrence of an inconsistency regarding line speed between UPLINK and DOWNLINK.

FIG. 6 shows a list of cost values in connection with line speeds (or transmission speeds) of wireless networks. For example, a cost value is calculated at "19" with respect to the wired network B having a line speed of 100 MBPS. A cost value is calculated at "4" with respect to the wired network C having a line speed of 1000 MBPS. A cost value is calculated at "9" with respect to the wireless network X having a line speed of 310 MBPS. In this connection, the above calculation is used to produce cost values for line speeds, whereas, for the sake of simplifying description, the present embodiment adopts cost values, shown in the list of FIG. 6, as calculated values.

FIG. 7 shows a list of cost values in connection with the segments connected to the ports of the wireless communication devices 10 configuring the pathway control system. FIG. 7 shows that cost values for the segments connected to the ports of the wireless communication devices 10 are stored in connection with MAC addresses of the wireless communication devices 10. As to the wireless communication device 10a having a MAC address of "00:00:4C:00:00:11", a cost value for a port A1 connected to the wireless network X is set to "9" while a cost value for a port B1 connected to the wired network B is set to "19" with reference to the list of FIG. 6. As to the wireless communication device 10b having a MAC address of "00:00:4C:00:00:12", a cost value for a port A2 connected to the wireless network X is set to "9" while a cost value for a port B2 connected to the wired network C is set to "4". As to the wireless network device 10c having a MAC address of "00:00:4C:00:00:13", a cost value for a port A3 connected to the wired network B is set to "19" while a cost value for a port B3 connected to the wired network C is set to "4". As to the wireless communication device 10*d* having a MAC address of "00:00:4C:00:00:14", a cost value for a port A4 connected to the wireless network Y is set to "9" while a cost value for a port B4 connected the wired network D is set to "4".

Figure 8:
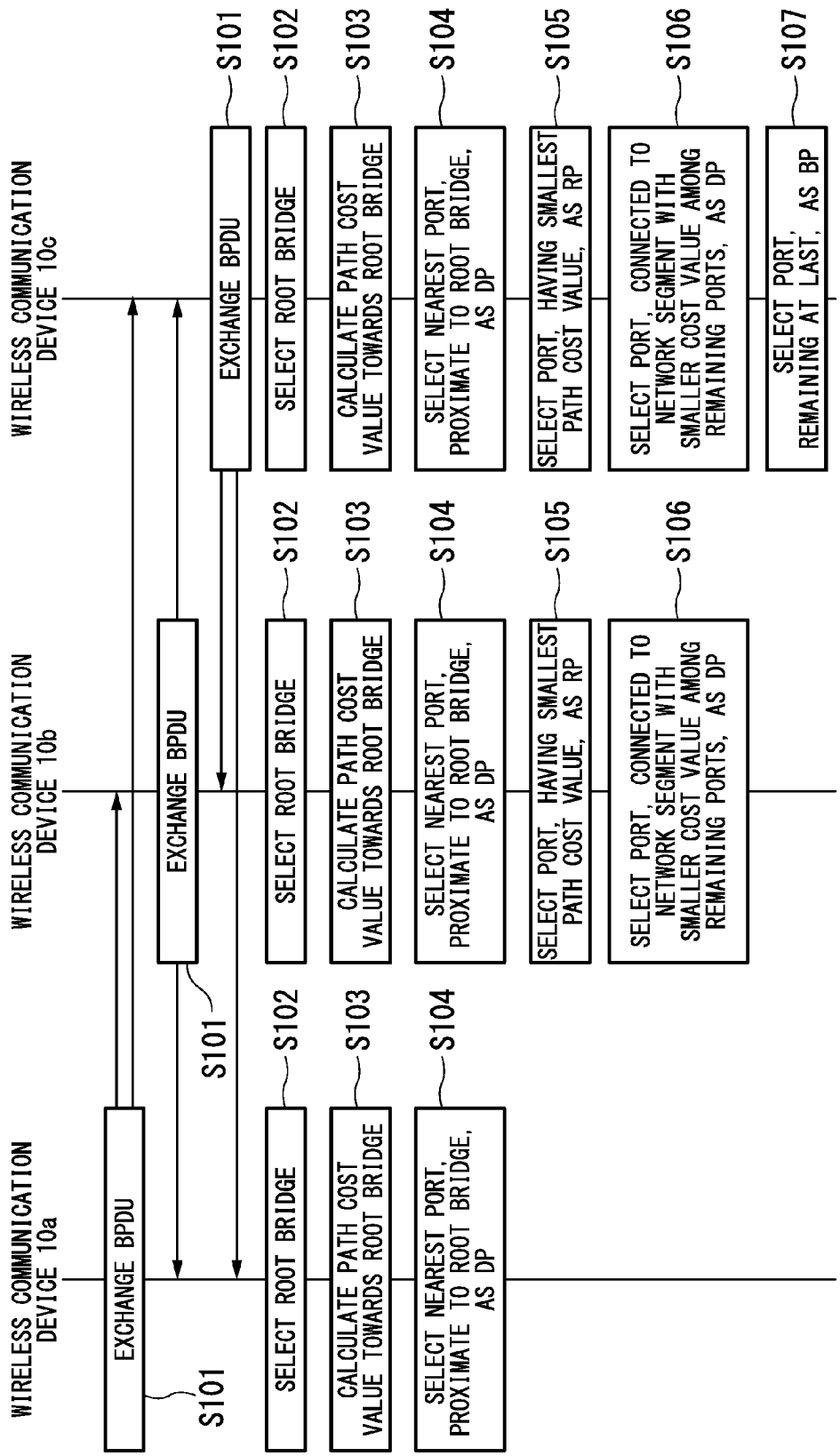
FIG. 8 A flowchart illustrating a first process flow in the pathway control system.

FIG. 8 is a flowchart showing a first process flow according to the pathway control system. When the power is applied to the wireless communication devices 10 being turned on, the wireless communication devices 10*a*, 10*b*, 10*c*, configuring a loop network, exchange bridge IDs (e.g. MAC addresses of devices) and BPDU (Bridge Protocol Data Unit) including path cost values (step S101). The wireless communication devices 10*a*, 10*b*, 10*c* select a root bridge having a minimum bridge ID based on the received PPDU packets (step S102). The present embodiment using MAC addresses as bridge IDs selects the wireless communication device 10*a* having a minimum MAC address as a root bridge.

Next, the wireless communication devices 10*a*, 10*b*, 10*c*, configuring a loop network, calculates path cost values toward the wireless communication device 10*a* serving as a root bridge (step S103). The wireless communication device 10*a*, serving as a root bridge, does not calculate path cost values. In step S103, the wireless communication device 10*b* calculates path cost values with respect to two pathways towards the wireless communication device 10*a*. As to a first pathway, i.e. the wireless network X, directly connecting between the wireless communication devices 10*a*, 10*b*, a path cost value for the port A2 of the wireless communication device 10*b* is calculated at "9" with reference to the list of FIG. 6. As to a second pathway, i.e. the wired networks C, B laid between the wireless communication devices 10*a*, 10*b* with path cost values "4", "19", a total path cost value for the port B2 of the wireless communication device 10*b* is calculated at "23".

In step S103, the wireless communication device 10*c* calculates path cost values with respect to two pathways towards the wireless communication device 10*a*. As to a first pathway, i.e. the wired network B directing connecting between the wireless communication devices 10*c*, 10*a*, a path cost value for the port A3 of the wireless communication device 10*c* is calculated at "19" with reference to the list of FIG. 6. As to a second pathway, i.e. the wired network C and the wireless network X laid between the wireless communication devices 10*c*, 10*a* with path cost values "4", "9", a total path cost value for the port B3 of the wireless communication device 10*c* is calculated at "13".

Next, the wireless communication devices 10*a*, 10*b*, 10*c* selects the nearest port, proximate to the root bridge, as DP (step S104). That is, the ports A1, B1 of the wireless communication device 10*a* are each selected as the nearest port DP proximate to the root bridge. On the other hand, each of the wireless communication devices 10*b*, 10*c* serving as non-root bridges selects a port having a smaller path cost value, towards the root bridge, as RP (Root Port) (step S105). Specifically, the wireless communication device 10*b* compares the path cost value "9" of the port A2 with the path cost value "23" of the port B2 so as to select the port A2, having a smaller path cost value, as RP. The wireless communication device 10*c* compares the path cost value "19" of the port A3 with the path cost value "13" of the port B3 so as to select the port B3, having a smaller path cost value, as RP.

Next, each of the wireless communication devices 10*b*, 10*c* serving as non-root bridges selects a port, connected to a network segment having a smaller path cost value among path cost values calculated for network segments connected to the remaining ports, as DP (step S106). The wireless communication devices 10*b*, 10*c*, having the ports B2 and A3 both of which have not been selected as DP or RP yet, compares the path cost value "4" of the wired network C connected to the port B2 with the path cost value "19" of the wired network B connected to the port A3, thus selecting the port B2, which is connected to the wired network C with a smaller path cost value, as DP. Then, the wireless communication device 10*c* selects the port A3, remaining at last, as BP (Blocking Port) (step S107).

Figure 9:
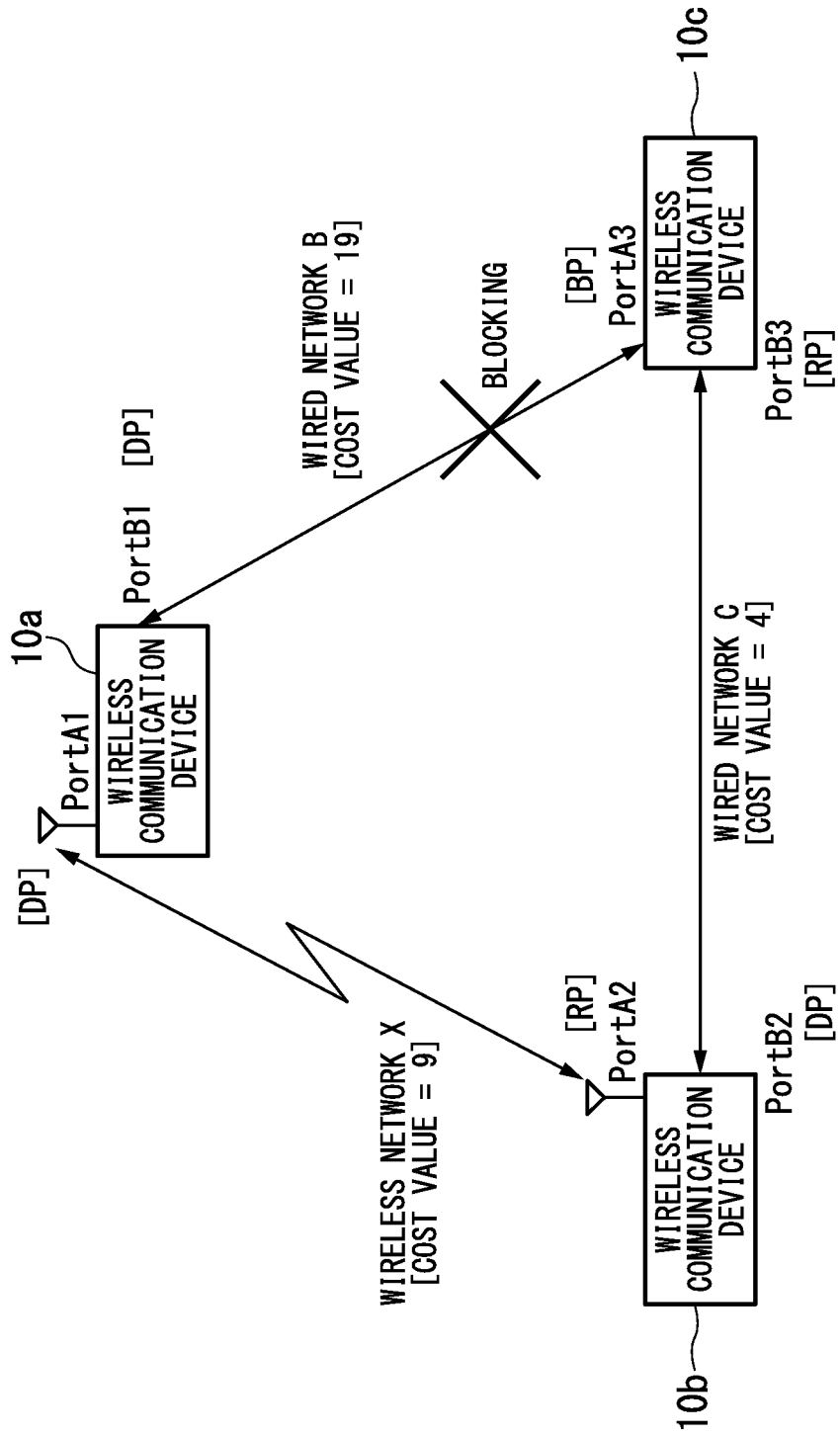
FIG. 9 A block diagram showing the STP pathway control result at a normal mode of a wireless network involved in a loop network.

FIG. 9 is a block diagram showing the STP pathway control result in a normal mode of the wireless network X. As shown in FIG. 9, the wireless communication device 10*c* selects the port A3 as BP on condition that fading does not occur in the wireless network X; hence, it blocks packets at the port A3, thus terminating a broadcast stream.

Figure 10:
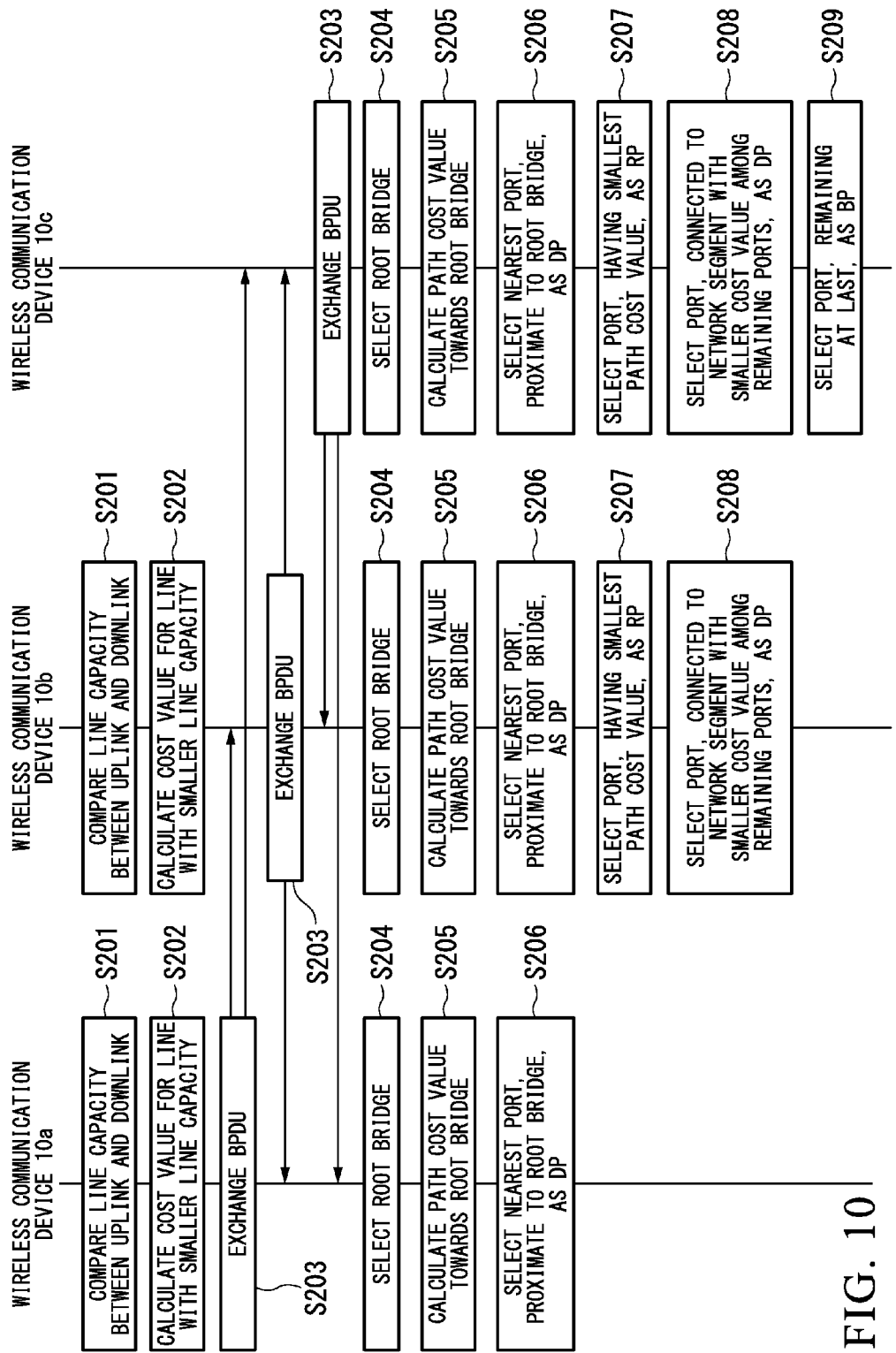
FIG. 10 A flowchart showing a second process flow in the pathway control system.
Figures 11, 12:
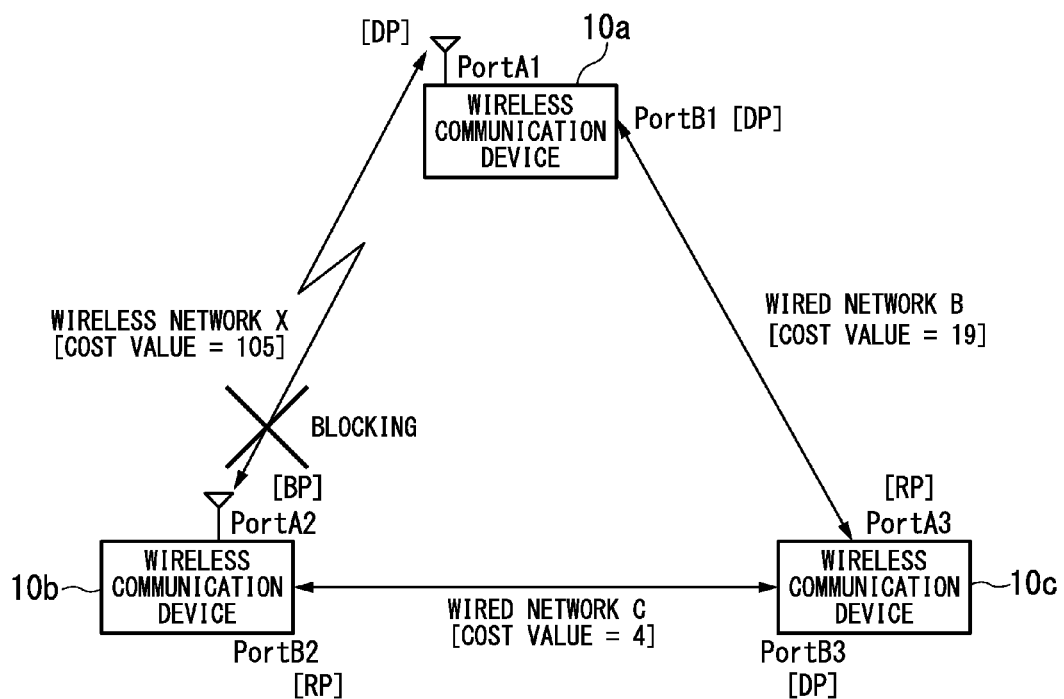
FIG. 11 A list illustrating the relationship between line speeds and cost values in a wireless network.
FIG. 12 A block diagram showing the STP pathway control result in a fading state of a wireless network.

FIG. 10 is a flowchart showing a second process flow according to the pathway control system. FIG. 11 is a list showing the relationship between cost values and line speeds in communication networks.

Next, a process adapted to a reduction of line speed (or transmission speed) due to fading in the wireless network X will be described. By implementing the first process flow shown in FIG. 8, the wireless communication device 10*a* is selected as a root bridge. In this condition, the wireless communication devices 10*a*, 10*b* may operate the modulation demodulation controllers 108 to activate an AMR function due to the occurrence of fading in the wireless network X, thus causing a variation of UPLINK line speed from 310 MBPS to 10 MBPS. At this time, the failure occurrence determination parts 162, included in the agents 106 of the wireless communication devices 10*a*, 10*b*, acquire and compare UPLINK line speed and DOWNLINK line speed, applied between the wireless communication devices 10*a*, 10*b*, which are detected by the communication speed detectors 161 (step S201). When a difference between UPLINK line speed and DOWNLINK line speed is equal to or above a threshold value, it is necessary to determine which one of UPLINK and DOWNLINK communication directions undergoes communication failure in wireless communication. For example, it is possible to determine that communication failure may occur in UPLINK having a slower line speed. The failure occurrence determination part 162 notifies the UPLINK line speed, undergoing communication failure, to the pathway controller 164. The pathway controller 164 calculates a cost value for the wireless network X by way of the foregoing cost value calculation using the UPLINK line speed (step S202). The present embodiment sets a cost value to "105" when the line speed of the wireless network X is changed to 10 MBPS. Through comparison, FIG. 11 differs from FIG. 6 in terms of the line speed and the cost value of the wireless network X, wherein FIG. 11 shows a cost value after fading affecting the wireless network X.

The pathway controller 164, included in the agent 106 of the wireless communication device 10, carries out pathway control in a similar manner as the first process which was carried out before the occurrence of fading in wireless communication via the wireless network X. That is, the path controllers 164, included in the wireless communication devices 10*a*, 10*b*, 10*c* configuring a loop network, exchange bridge IDs and BPDU including path cost values (step S203). The pathway controllers 164 of the wireless communication devices 10*a*, 10*b*, 10*c* select a wireless communication device, having a minimum bridge ID, as a root bridge based on the received BPDU packets (step S204). In this case, the wireless communication device 10*a* is selected as a root bridge.

Next, the pathway controllers 164 of the wireless communication devices 10a, 10b, 10c, configuring a loop network, calculate path cost values towards the wireless communication device 10a serving as a root bridge (step S205). The wireless communication device 10a, serving as a root bridge, does not calculate path cost values. In step S205, the pathway controller 164 of the wireless communication device 10b calculates path cost values with respect to two pathways towards the wireless communication device 10a. As to a first pathway, i.e. the wireless network X directing connecting between the wireless communication devices 10a, 10b, a path cost value for the port A2 of the wireless communication device 10b is calculated at "105" with reference to the list of FIG. 11. As to a second pathway, i.e. the wired networks C, B laid between the wireless communication devices 10a, 10b with path cost values "4", "19", a total path cost value for the port B2 of the wireless communication device 10b is calculated at "23".

In step S205, the wireless communication device 10c calculates path cost values with respect to two pathways towards the wireless communication device 10a. As to a first pathway, i.e. the wired network B directing connecting between the wireless communication devices 10c, 10a, a path cost value for the port A3 of the wireless communication device 10c is calculated at "19" with reference to the list of FIG. 11. As to a second pathway, i.e. the wired network C and the wireless network X laid between the wireless communication devices 10c, 10a with path cost values "4", "105", a total path cost value for the port B3 of the wireless communication device 10c is calculated at "109".

Next, the pathway controllers 164 of the wireless communication devices 10a, 10b, 10c select the nearest port, proximate to the root bridge, as DP (step S206). That is, the ports A1, B1 of the wireless communication device 10a, serving as the root bridge, are selected as the nearest ports DP proximate to the root bridge. On the other hand, the pathway controllers 164 of the wireless communication devices 10b, 10c, serving as non-root bridges, select ports, each having a smaller path cost value towards the root bridge, as RP (Root Port) (step S207). That is, the pathway controller 164 of the wireless communication device 10b compares the path cost value "105" of the port A2 with the path cost value "23" of the port B2 so as to select the port B2, having a smaller path cost value, as RP. The pathway controller 164 of the wireless communication device 10c compares the path cost value "19" of the port A3 with the path cost value "109" of the port B3 so as to select the port A3, having a smaller cost value, as RP.

Next, the pathway controllers 164 of the wireless communication devices 10b, 10c, serving as non-root bridges, select a port connected to a network segment with a smaller path cost value, among path cost values calculated for network segments connected to the remaining ports, as DP (step S208). That is, the pathway controllers 164 of the wireless communication devices 10b, 10c, having the ports A2, B3 which have not been selected as DP, RP yet, compares the path cost value "105" for the port A2 connected to the wireless network X with the path cost value "4" for the port B3 connected to the wired network C, thus selecting the port B3, connected to the wired network C with a smaller path cost value, as DP. Then, the wireless communication device 10c selects the port A2, remaining at last, as BP (Blocking Port) (step S209).

The second process flow activating an AMR function works based on a precondition that a time incurring a reduction of a reception level due to fading via a reflected wave may range from several seconds to ninety seconds, then, the reception level will be restored.

FIG. 12 is a block diagram showing the STP pathway control result reflecting the occurrence of fading in the wireless network X. As shown in FIG. 12, the port A2 of the wireless communication device 10b is selected as BP when fading occurs in the wireless network X, and therefore the port A2 blocks packets, thus terminating a broadcast stream.

As described above, the present embodiment, owing to the presence of redundant pathways in a network, is able to automatically switch to redundant pathways irrespective of a reduction of line speed due to activation of an AMR function, thus maintaining an adequate capacity for a communication pathway. Additionally, the present embodiment, implementing STP pathway control, is able to reliably carry out pathway control via a wireless network or a combination of LAN (Local Area Network) and WAN (Wide Area Network). Moreover, the present embodiment, adopting L2 (i.e. Layer 2: a data link layer in an OSI reference model), is able to realize pathway control not depending on a high-rank protocol (e.g. "IPv4/IPv6/IPSEC" or "TCP/UDP/SCTP").

Figure 13:
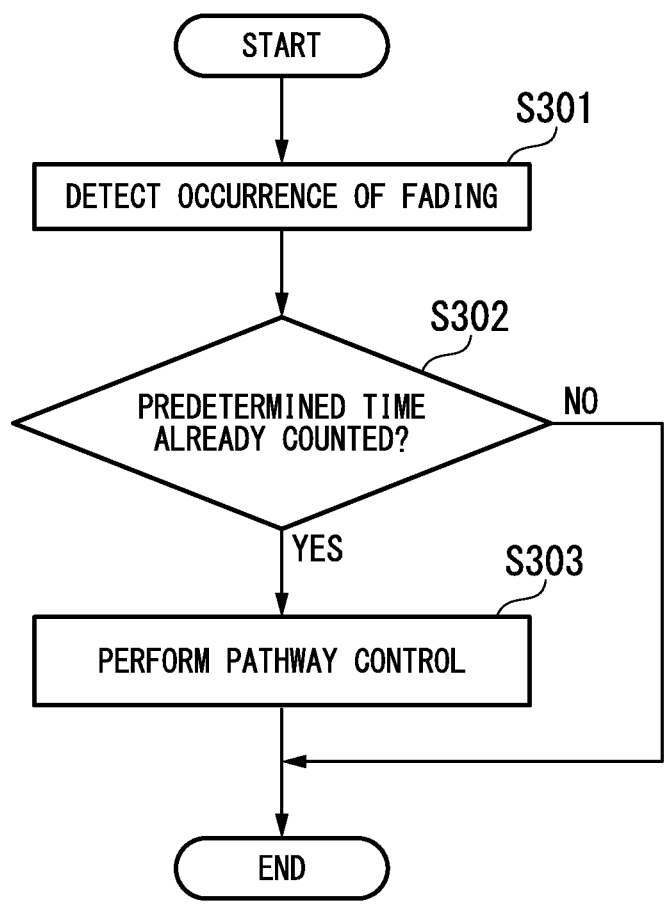
FIG. 13 A flowchart illustrating a third process flow in the pathway control system.

FIG. 13 is a flowchart showing a third process flow according to the pathway control system. In addition to the foregoing process, it is possible to carry out pathway control again due to activation of an AMR function when a predetermined time elapses after execution of previous pathway control. Specifically, when the failure occurrence determination part 162 detects the occurrence of fading (step S301) on condition that a timer has already started counting after the foregoing step S107 or S209, it is determined whether or not the timer counter 112 counts a predetermined time (step S302). Herein, the predetermined time is an elapsed time counted after an exit time of pathway control via step S107 or S209. When the predetermined time or more elapses after an exit of pathway control, pathway control is carried out due to activation of an AMR function by way of the foregoing steps S101 to S107 or steps S201 to S209 (step S303). The third process flow may prevent unnecessary switching of pathways or momentary disconnection of a wireless line due to switching.

Figure 14:
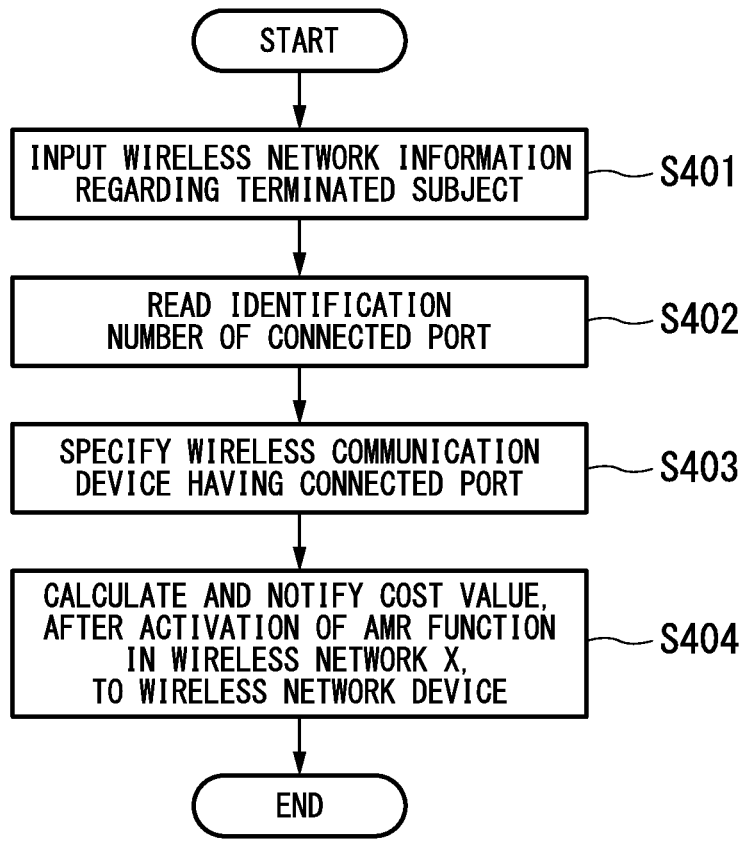
FIG. 14 A flowchart illustrating a process flow of the monitoring device of the pathway control system.

FIG. 14 is a flowchart showing a process flow of the monitoring device 31 according to the pathway control system. That is, it is possible to allow the monitoring device 31 to perform pathway control. First, an operator of the monitoring device 31 inputs wireless network information (i.e. a termination request for a communication path connected to a communication device) for a termination subject to the termination request reception part 302 (step S401). For example, it may input information of the wireless network X as a termination subject. The pathway control aid part 303 of the monitoring device 31 reads an identification number of a connected port of the wireless communication device 10, connected to the wireless network X, from a database registered with the storage unit 304 (step S402). Then, the pathway control aid part 303 specifies the wireless communication device 10, having the connected port, based on the identification number of the connected port connected to the wireless network X serving as a termination subject (step S403). The pathway control aid part 303 calculates a cost value, after activation of an AMR function in the wireless network X, so as to notify it to the specified wireless communication device 10 (i.e. a communication device connected to a communication pathway regarded as a termination subject) (step S404). Upon receiving a new cost value for the wireless network X, the wireless communication device 10 performs the foregoing pathway control process by use of the new cost value. Thus, it is possible for an operator to manually conduct pathway control.

The present embodiment is described with respect to the processing limited to STP pathway control; however, STP may be identical to RSTP in terms of an operation of the wireless communication device 10 reflecting line speed in calculation of a cost value. Therefore, it is possible to implement RSTP pathway control instead of STP pathway control.

In this connection, all of the wireless communication device, the monitoring device, and the terminal are designed to include a computer system therein. For this reason, the foregoing processing whose content is drafted as a program is recorded in computer-readable recording media; hence, a computer reads and executes this program to implement the processing of the present embodiment. Herein, computer-readable recording media refers to magnetic disks, optical-magnetic disks, CD-ROM, DVD-ROM, and semiconductor memory. Additionally, it is possible to distribute this program to a computer via a communication line, thus allowing the computer to execute the program.

This program may represent a part of the foregoing function. Moreover, this program may be drafted as a differential program (or a differential file) which may be combined with another program preinstalled in a computer system, thus realizing the foregoing function.

INDUSTRIAL APPLICABILITY

The present invention is applicable to selective control of communication pathways between a plurality of communication devices connected together via wired/wireless networks; in particular, the present invention is able to realize optimum pathway control, irrespective of communication failure, in a wireless network connected to a wireless communication device having an AMR function.

REFERENCE SIGNS LIST 10 wireless communication device
21, 22 terminal
31 monitoring device
101 modulator
102 demodulator
103 receiver
104 transmitter
105 antenna
106 agent
107 demultiplexer
108 modulation demodulation controller
109 input terminal
110 output terminal
111 wired communication part
161 communication speed detector
162 failure occurrence determination part
163 adaptive modulation controller
164 pathway controller
165 pathway control termination determination part
166 storage unit
301 controller
302 termination request reception part
303 pathway control aid part
304 storage unit

The invention claimed is:

1. A pathway control system comprising a plurality of wireless communication devices, wherein each of the plurality of wireless communication devices is configured to carry out a Spanning Tree Protocol (STP) pathway control process, and each of the plurality of wireless communication devices comprises:
a communication speed detector which detects an uplink communication speed of an uplink wireless communication on a first frequency and a downlink communication speed of a downlink wireless communication on a second frequency, different from the first frequency;
a failure occurrence determination part which determines whether there is a communication failure in the uplink wireless communication and whether there is a communication failure in the downlink wireless communication;
an adaptive modulation controller which carries out adaptive modulation control on the uplink wireless communication, independent of the downlink wireless communication, if there is a communication failure in the uplink wireless communication, thereby calculating a new uplink communication speed, and carries out adaptive modulation control on the downlink wireless communication, independent of the uplink wireless communication, if there is a communication failure in the downlink wireless communication, thereby calculating a new downlink communication speed; and
a pathway controller which carries out STP pathway control based on the new uplink communication speed or the new downlink communication speed.

2. The pathway control system according to claim 1, wherein the pathway controller terminates
the STP pathway control when a recovery degree per unit time, regarding the new uplink communication speed or the new downlink communication speed, is equal to or above a threshold value.

3. The pathway control system according to claim 1, further comprising: a monitoring device comprising:
a termination request reception part which receives a termination request for a communication pathway connecting a first one of the plurality of wireless communication devices and a second one of the plurality of wireless communication devices, and
a pathway control aid part which calculates cost values used to control the STP pathway with respect to ports of the first wireless communication device and the second wireless communication device, based on the received termination request.

4. A pathway control method for implementing control and setting for communication pathways among a plurality of wireless communication devices, the pathway control method comprising:
detecting, with a communication speed detector of a wireless communication device of the plurality of wireless communication devices, an uplink communication speed of an uplink wireless communication on a first frequency and a downlink communication speed of a downlink wireless communication on a second frequency, different from the first frequency;
determining, with a failure occurrence determination part of the wireless communication device, whether there is a communication failure in the uplink wireless communication and whether there is a communication failure in the downlink wireless communication;
carrying out adaptive modulation control, with an adaptive modulation controller of the wireless communication device, on the uplink wireless communication, independent of the downlink wireless communication, if there is a communication failure in the uplink wireless communication, thereby calculating a new uplink communication speed, and carrying out, with the adaptive modulation controller, adaptive modulation control on the downlink wireless communication, independent of the uplink wireless communication, if there is a communication failure in the downlink wireless communication, thereby calculating a new downlink communication speed; and carrying out, with a pathway controller of the wireless communication device, a Spanning Tree Protocol (STP) pathway control based on the new uplink communication speed or the new downlink communication speed.

5. The pathway control method according to claim 4, further comprising:

terminating, with the pathway controller, the STP pathway control when a recovery degree per unit time, regarding the new uplink communication speed or the new downlink communication speed is equal to or above a threshold value.

6. The pathway control method according to claim 4, further comprising:

receiving, at a monitoring device, a termination request for a communication pathway connecting a first one of the plurality of wireless communication devices and a second one of the plurality of wireless communication devices; and calculating cost values to control the STP pathway with respect to ports of the first wireless communication device and the second wireless communication device, based on the received termination request.

7. A wireless communication device configured for wired communication and wireless communication, the wireless communication device comprising:

a communication speed detector which detects an uplink communication speed of an uplink wireless communication on a first frequency and a downlink communication speed of a downlink wireless communication on a second frequency, different from the first frequency;

a failure occurrence determination part which determines whether there is a communication failure in the uplink wireless communication and whether there is a communication failure in the downlink wireless communication;

an adaptive modulation controller which carries out adaptive modulation control on the uplink wireless communication, independent of the downlink wireless communication, if there is a communication failure in the uplink wireless communication, thereby calculating a new uplink communication speed, and carries out adaptive modulation control on the downlink wireless communication, independent of the uplink wireless communication, if there is a communication failure in the downlink wireless communication, thereby calculating a new downlink communication speed; and a pathway controller which carries out a Spanning Tree Protocol (STP) pathway control based on the new uplink communication speed or the new downlink communication speed.

8. The wireless communication device according to claim 7, further comprising terminating the STP pathway control when a recovery degree per unit time, regarding the new uplink communication speed or the new downlink communication speed is equal to or above a threshold value.

9. A processing method for a wireless communication device configured for wired communication and wireless communication, the processing method comprising:

detecting, with a communication speed detector, an uplink communication speed of an uplink wireless communication on a first frequency and a downlink communication speed of a downlink wireless communication on a second frequency, different from the first frequency;

determining, with a failure occurrence determination part, whether there is a communication failure in the uplink wireless communication and whether there is a communication failure in the downlink wireless communication;

carrying out adaptive modulation control, with an adaptive modulation controller, on the uplink wireless communication, independent of the downlink wireless communication, if there is a communication failure in the uplink wireless communication, thereby calculating a new uplink communication speed, and carrying out adaptive modulation control, with the adaptive modulation controller, on the downlink wireless communication, independent of the uplink wireless communication, if there is a communication failure in the downlink wireless communication, thereby calculating a new downlink communication speed; and carrying out, with a pathway controller, a Spanning Tree Protocol (STP) pathway control based on the new uplink communication speed or the new downlink communication speed.

10. A non-transient computer-readable storage medium causing a computer of a wireless communication device, configured for wired communication and wireless communication, to perform a method comprising:

detecting an uplink communication speed of an uplink wireless communication on a first frequency and a downlink communication speed of a downlink wireless communication on a second frequency, different from the first frequency;

determining whether there is a communication failure in the uplink wireless communication and whether there is a communication failure in the downlink wireless communication;

carrying out adaptive modulation control on the uplink wireless communication, independent of the downlink wireless communication, if there is a communication failure in the uplink wireless communication, thereby calculating a new uplink communication speed, and carrying out adaptive modulation control on the downlink wireless communication, independent of the uplink wireless communication, if there is a communication failure in the downlink wireless communication, thereby calculating a new downlink communication speed; and carrying out a Spanning Tree Protocol (STP) pathway control based on the new uplink communication speed or the new downlink communication speed.

* * * * *